UNITED STATES PATENT OFFICE.

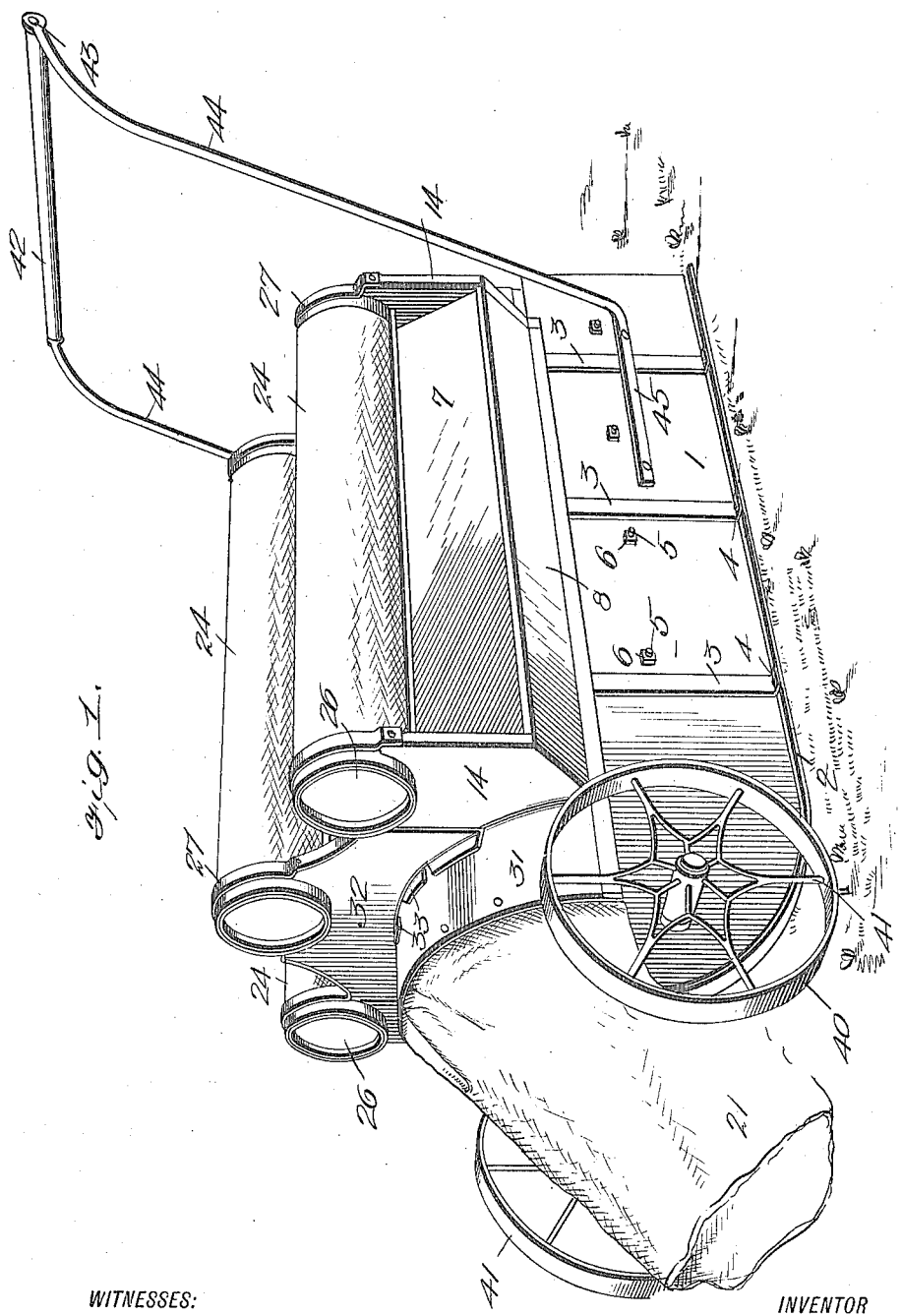

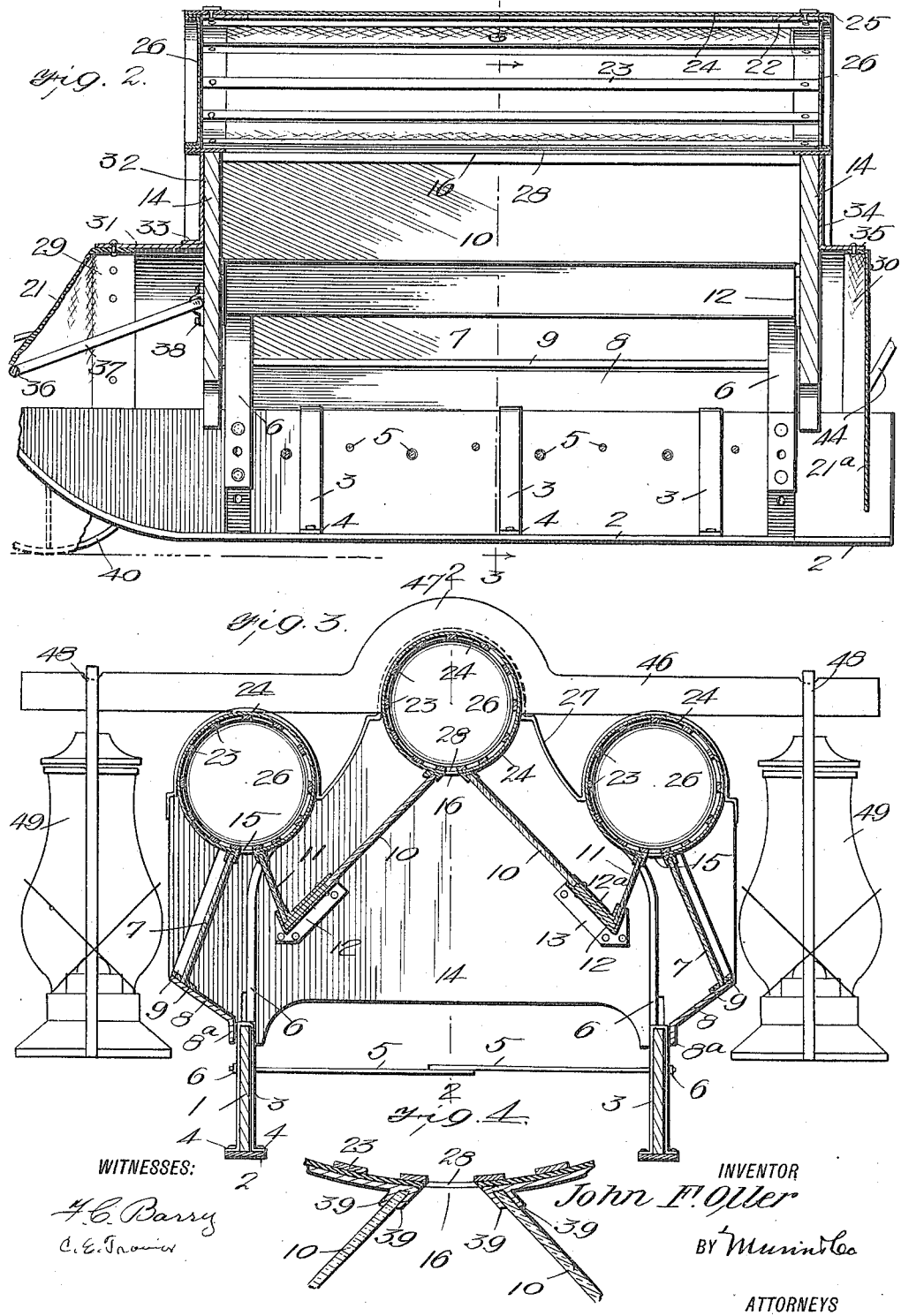

JOHN FRANKLIN OLLER, OF DELRAY, FLORIDA.

FLY-TRAP.

1,180,068.  Specification of Letters Patent.  Patented Apr. 18, 1916.

Application filed June 15, 1915. Serial No. 34,133.

*To all whom it may concern:*

Be it known that I, JOHN F. OLLER, a citizen of the United States, and a resident of Delray, in the county of Palm Beach and State of Florida, have invented certain new and useful Improvements in Fly-Traps, of which the following is a specification.

My invention is an improvement in fly traps, and has for its object to provide a trap adapted for catching the fly known as the "grape leaf hopper," or black fly, that is so destructive to the bean industry in Southern States, and the invention has for its object to provide a device of the character specified mounted to be drawn through the field, and having means for causing the flies to arise from the ground and the plants, and having means for catching the flies as they arise.

In the drawings: Figure 1 is a perspective view of the improved machine; Fig. 2 is a longitudinal vertical section of the trap proper; Fig. 3 is a section on the line 3—3 of Fig. 2, looking in the direction of the arrow adjacent to the line, and Fig. 4 is an enlarged detail section through one of the traps.

The present embodiment of the invention comprises a pair of runners 1 arranged in spaced relation and parallel with each other, and each runner has a shoe 2 on its under side, and extending from the rear to the front end of the runner, to prevent sinking of the runner into the ground. The runners are secured to the shoes by means of U-shaped clips 3, each comprising a body extending transversely of the top of the runner, and arms extending downwardly along the opposite faces of the runner to the shoe, and each clip is secured to the shoe by means of rivets or the like passing through angular lugs 4 at the lower ends of the arms and through the runners.

Each runner is provided with a series of inwardly extending resilient fingers 5, said fingers being in the form of rods held to the runner by nuts 6, and the fingers of each runner overlap intermediate the runners with the fingers of the other runner. The runners are connected at their rear ends and near their front ends by arch bars 6, which are connected to both runners and extend upwardly between the runners.

Glass plates 7 are arranged in inclined position at the outer sides of the runners, the said plates inclining upwardly and inwardly, and each plate is supported at its lower end by a plate 8 resting upon the runner at its inner end, and inclining outwardly toward its outer end. These plates have strips 9 secured to their upper faces and near their outer sides, and the lower edges of the plates 7 rest between these strips to prevent inward movement of the said lower edges. Other plates 10 of glass are arranged just above the space between the runners, said plates converging toward their upper and inner edges and inclining upwardly, and other plates 11 of glass are arranged at the outer edges of the plates 10, the plates 11 inclining outwardly and upwardly.

The adjacent edges of each pair of plates 10 and 11 is supported in an angle plate 12, the said plates 12 being arranged at opposite sides of the machine, each plate being near a runner and above the same, and the plates having lugs 13 at their ends which are secured to the ends 14 of the frame. The adjacent edges of each pair of plates 10 and 11 are in contact, and each plate 11 coöperates with the adjacent plate 7, while the plates 10 coöperate with each other.

The meeting edges of each pair of plates 7 and 11 are spaced apart to form a narrow passage 15 extending longitudinally of the machine, and the adjacent edges of the plates 10 are spaced apart to form a narrow passage 16 at the center of the machine and extending longitudinally thereof.

The ends 14 of the frame are plates, which rest at their lower edges upon the upper edge of the runners and transversely thereof, and the plates are parallel and each plate is cut away between the runners, as shown in Fig. 3, and those portions of each plate which engage the runners are notched to receive the edges of the runners. The plates 7, 10 and 11 abut against the inner faces of the plates 14 at their ends, the space between the lower edge of each plate 7 and the upper edge of the runner being closed by the adjacent plate 8.

Each of the plates 8, as shown in Fig. 3, has a marginal flange 8ª at its lower end, which fits the outer face of the adjacent runner and is secured thereto in any suitable or desired manner. Thus the space between the runners and above the same is closed by the glass plates 7, 10 and 11 and the plates 8, and a trap is arranged at each passage 15 and at the passage 16. The fingers 5 extend inwardly just below the lower edges of the plates 14.

Each pair of glass plates 10 and 11 rests in the trough of an angle plate, and another angle plate 12ª is arranged above the meeting edges of each pair to hold them from upward movement. The space below the lower edge of each plate 14 is normally closed by a curtain, a curtain 21 being arranged at the front of the frame, and a curtain 21ª at the rear.

Traps in the form of cylinders are supported at the passages 15 and 16, one trap being supported at each passage. Each of the cylinders comprises a pair of rings 22 arranged coaxial and in spaced relation, and the rings are connected by slats 23 which are spaced apart from each other at regular intervals. The slats are secured to the rings in any suitable manner, as for instance, by rivets, as shown, and the slats are inside of the rings 22. Each cylinder is covered and inclosed by a covering 24 of fabric material, and the said coverings extend between rings 25 which are fitted outside of the rings 22.

It will be noted from an inspection of Fig. 2, that the inner end of each ring 22 extends beyond the adjacent ring 25, while the outer end of each ring 25 extends beyond the adjacent ring 22. The rings 25 and 22 are connected together by rivets, which connect the slats to the rings, and the end of each cylinder is closed by a head 26. Each of the heads 26 has a marginal flange, as shown, and these flanges fit inside the rings 22.

The cylinders are supported by the arch bars 6 and by the plates 14, and the upper edges of the plates 14 have concave recesses for receiving the ends of the cylinders. The traps are seated in these recesses, and they are held in place by metal straps 27, each of which passes from one end of the adjacent plate 14 to the other end, passing over the traps, and being secured to the upper edge of the trap between the respective plates, as shown in Fig. 3.

The covering 24 of each cylinder is slotted longitudinally between adjacent slats, the entire length of the cylinder, as shown at 28, and the cylinders are arranged with this passage 28 registering with a passage 15 or 16, as the case may be. The inclined plates 7, 10, and 11, form converging guides for directing the flies into the respective cylinders.

Arch bars 29 and 30 are arranged at the ends of the runners, extending transversely between the runners, and secured at their ends to the respective runners, and the arch bar 29 is spaced forwardly from the adjacent plate 14. The arch bar 30 is spaced rearwardly from the adjacent plate 14, and a hood 31 is arranged between the arch bar 29 and the adjacent plate 14, the said hood extending from one runner to the other and from the front edge of the arch bar to the outer face of the plate.

A covering plate 32 is arranged on the outer face of the plate 14 and at the front of the frame, extending from the upper edge of the plate 14 to the hood 31, and at its lower end the plate 32 has a lateral flange 33 fitting the upper surface of the hood and lapping upon the said hood. A covering plate 34 is arranged on the outer face of the rear plate 14, between the upper edge thereof and the arch bar 30, and the covering plate has a marginal extension 35 at its lower end, which laps upon the arch bar and is secured thereto, as shown. The rear curtain 21ª has its upper edge connected to this extension 35, and the curtain depends to near the shoe 2 of the runner. The front curtain 21 is riveted to the forward edge of the hood 31, and the said curtain extends forwardly and downwardly, as shown.

A bail comprising a body 36 and arms 37 is journaled on the plate 14 at the front of the runners, the arms having journal pins which are held in bearings 38 on the plate. The bail extends forwardly and the body engages the curtain intermediate its lower and upper side edge, and it will be evident that by changing the angle of the bail with respect to the plate 14, the front edge of the curtain may be raised or lowered.

It will be noted from an inspection of Figs. 3 and 4 that the plates 7, 10 and 11 are held at their upper edges between pairs of holding lugs 39. The members of each pair are spaced apart from each other, to receive the edges of the plates between them, and these lugs are on the rings 22, at the inner ends of the said rings.

Wheels 40 are arranged at the front of the runners, each wheel being journaled on a journal pin 41 which extends laterally outward from the adjacent face of the runner, and a handle is connected with the rear end of the frame. This handle is in the form of a roller 42 which is journaled at its ends in bearings 43 in arms 44. These arms extend downwardly and each has an angular portion 45 at its lower end which is secured to the adjacent runner as shown. At their upper ends the arms curve rearwardly, supporting the roller 42 in convenient grasping position.

When the improved machine is used at night, the mechanism shown in Fig. 3 is used. This mechanism comprises a bar 46 arranged transversely of the traps or cylinders intermediate the ends thereof, and the said bar has an arched portion 47 fitting the central trap. On each side of the arch the bar rests upon the lateral traps. The bar is provided at each end with a notch 48 on its upper edge, and lanterns 49 are supported by the bar, the bails of the lanterns engaging the notches. The bar is of a length to extend beyond the machine at each side thereof, so that the lanterns are supported at opposite sides of the machine and in spaced relation.

It will be noted from an inspection of Figs. 1 and 3 that the central trap is arranged at a higher level than the lateral traps. The heads 26 of the traps are made detachable in order that they may be removed to permit the removal of the insects from the traps.

In use, the machine is drawn through the field with the runners on opposite sides of the row of plants. As the machine moves along, the spring fingers 5 engage the plants, disturbing the flies and causing them to arise. Their tendency is to fly upward when disturbed. They will move between the converging plates 7, 10 and 11, passing into the trap. The curtains 21 and 21ᵃ darken the lower part of the machine, and since the plates 10 and 11 do not obstruct the light, the flies will move upward to escape the dark and will move into the traps. From the traps the flies may be removed whenever it is desired.

I claim:

1. A device of the character specified, comprising a pair of approximately parallel laterally spaced runners, plates connecting the runners near the ends thereof, said plates extending upwardly from the tops of the runners, central and lateral approximately cylindrical traps supported above the runners, the lateral traps being above the runners, the upper edges of the plates being recessed to receive the ends of the traps, and supports at the plates for the traps, each trap having a longitudinally extending passage in its under side, and a pair of glass plates for each trap and arranged beneath the respective trap, each pair of plates converging toward the passage of the adjacent trap, and the members of each pair of plates contacting at its outer edge with the adjacent members of the adjacent pairs, solid plates arranged between the runners and the lower outer edges of the outermost plates of the lateral pairs, curtains of fabric material at the outer faces of the end plates and depending between the runners, each runner having a series of inwardly extending spring fingers, wheels for supporting the runners and the traps, and a handle connected with the runners at the rear thereof.

2. A device of the character specified, comprising a pair of approximately parallel laterally spaced runners, plates connecting the runners near the ends thereof, said plates extending upwardly from the tops of the runners, central and lateral approximately cylindrical traps supported above the runners, the upper edges of the plates being recessed to receive the ends of the traps, and supports at the plates for the traps, each trap having a longitudinally extending passage in its under side, and a pair of glass plates for each trap and arranged beneath the respective trap, each pair of plates converging toward the passage of the adjacent trap, and the members of each pair of plates contacting at its outer edge with the adjacent members of the adjacent pairs, solid plates arranged between the runners and the lower outer edges of the outermost plates of the lateral pairs, curtains of fabric material at the outer faces of the end plates and depending between the runners, each runner having a series of inwardly extending spring fingers.

3. A device of the character specified, comprising a body composed of laterally spaced parallel runners, vertical end plates connecting the runners at the ends thereof, and at the tops of the runners, central and lateral traps arranged above the runners and longitudinally thereof, each trap being cylindrical and having an opening in its under side, means in connection with the runners for supporting the traps at the tops of the end plates, each trap having a longitudinal opening in its under side, a pair of glass plates for each trap, the members of each pair converging toward the opening and abutting at their lower edges with the adjacent plates of the adjacent pairs, a closure below the lower ends of the outermost plates and the runners, curtains depending from each end plate between the runners, and a series of resilient fingers extending inward from each runner, the inner ends of the fingers of the series lapping.

4. A device of the character specified, comprising a body consisting of side plates and elevated end plates, approximately cylindrical traps supported by the end plates, each trap having an opening in its under side, a pair of inclined guide plates at each opening and at opposite sides thereof, and inclining downwardly and outwardly from the opening, the members of the innermost pair abutting at their lower side edges with the adjacent edges of the outermost pair, a connection between the outermost members of the outermost pairs and the side plates, curtains depending from each end plate between the side plates, and a series of inwardly extending resilient fingers on each side plate below the end plates, and a bail pivoted to the front end plate and engaging the front curtain for adjusting the said curtain.

JOHN FRANKLIN OLLER.

Witnesses:
A. MacNeilly,
Robert Rhoden.

Copies of this patent may be obtained for five cents each, by addressing the "Commissioner of Patents, Washington, D. C."